United States Patent
Olivas et al.

(10) Patent No.: US 6,273,454 B1
(45) Date of Patent: *Aug. 14, 2001

(54) AIRBAG OPENING EDGE PORTION HAVING COILED CONNECTION TO RETAINER

(75) Inventors: Margarita Olivas; Zeferino Rendon; Javier Limas, all of Chihuahua (MX)

(73) Assignee: TRW Vehicle Safety Systems Inc., Lyndhurst, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/163,986

(22) Filed: Sep. 30, 1998

(51) Int. Cl.[7] .................................................. B60R 21/16
(52) U.S. Cl. .......................................................... 280/728.2
(58) Field of Search ............................ 280/728.2, 728.1, 280/743.1, 731, 732

(56) References Cited

U.S. PATENT DOCUMENTS

| | | | |
|---|---|---|---|
| 4,286,954 | * 9/1981 | McArther et al. | 493/244 |
| 5,074,585 | 12/1991 | Satoh . | |
| 5,096,222 | 3/1992 | Komerska et al. . | |
| 5,178,407 | * 1/1993 | Kelley | 280/728 |
| 5,255,937 | * 10/1993 | EmamBakhsh et al. | 280/728 |
| 5,308,110 | 5/1994 | Kokeguchi . | |
| 5,340,151 | * 8/1994 | Sato | 280/743 R |
| 5,356,174 | * 10/1994 | Rhein et al. | 280/728.2 |
| 5,362,101 | * 11/1994 | Sugiura et al. | 280/743.2 |
| 5,513,876 | 5/1996 | Matsumoto . | |
| 5,556,126 | * 9/1996 | Lee | 280/728.3 |
| 5,607,179 | 3/1997 | Lenart et al. . | |
| 5,673,930 | 10/1997 | Coleman . | |
| 5,684,283 | * 11/1997 | Hambleton, Jr. et al. | 200/61.08 |
| 5,765,867 | * 6/1998 | French | 280/743.1 |
| 5,810,390 | * 9/1998 | Enders et al. | 280/730.2 |
| 5,823,566 | * 10/1998 | Manire | 280/743.1 |
| 5,906,395 | * 5/1999 | Isaji et al. | 280/743.1 |
| 5,997,037 | * 12/1999 | Hill et al. | 280/743.2 |

FOREIGN PATENT DOCUMENTS

| | | | |
|---|---|---|---|
| 3-109149 | * 5/1991 | (JP) | 280/728 |
| 5-294201 | * 11/1993 | (JP) | 280/731 |
| 6-127321 | * 5/1994 | (JP) | 280/743.1 |
| 08324370 | 10/1996 | (JP) . | |

* cited by examiner

*Primary Examiner*—Brian L. Johnson
*Assistant Examiner*—G B Klebe
(74) *Attorney, Agent, or Firm*—Tarolli, Sundheim, Covell, Tummino & Szabo L.L.P.

(57) ABSTRACT

An apparatus (10) comprises an inflatable vehicle occupant protection device (14). The protection device (14) has a panel structure (52). The panel structure (52) has an open end portion (70) that is axially separated from a portion for attaching a body structure (50). At least one pair of axially aligned apertures (72 and 74) extends through the panel structure (52). The apparatus (10) further comprises a retainer (60) for supporting the open end portion (70) of the panel structure (52) of the protection device (14). The panel structure (52) is coiled around the retainer (60) such that the axially aligned apertures (72 and 74) become aligned on a same side of the retainer (60).

9 Claims, 3 Drawing Sheets

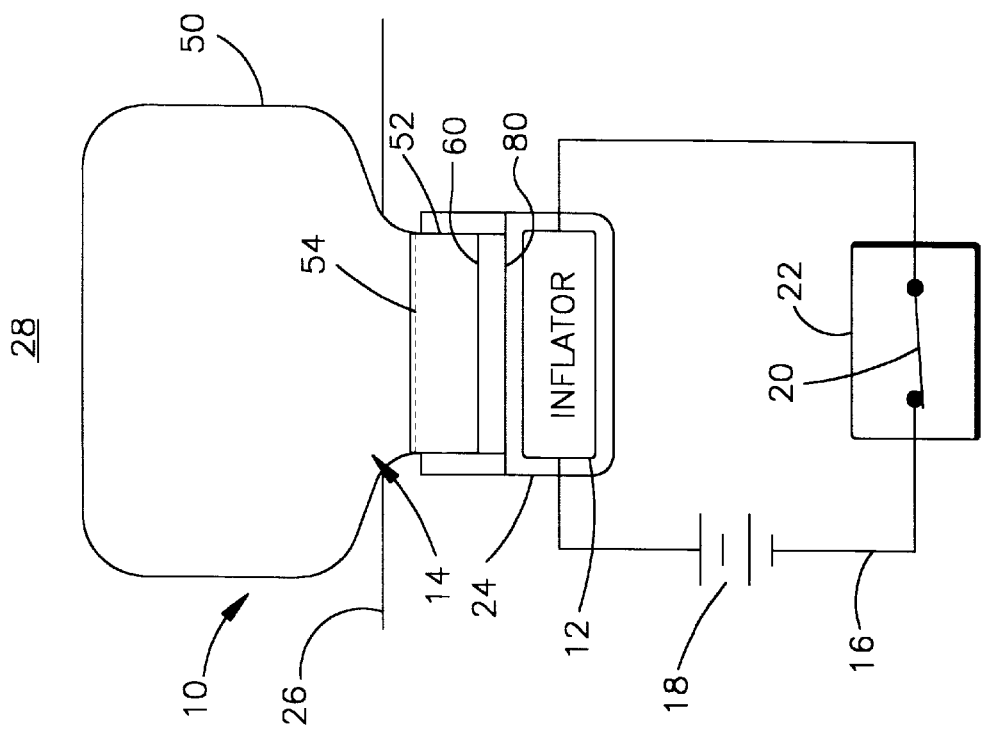
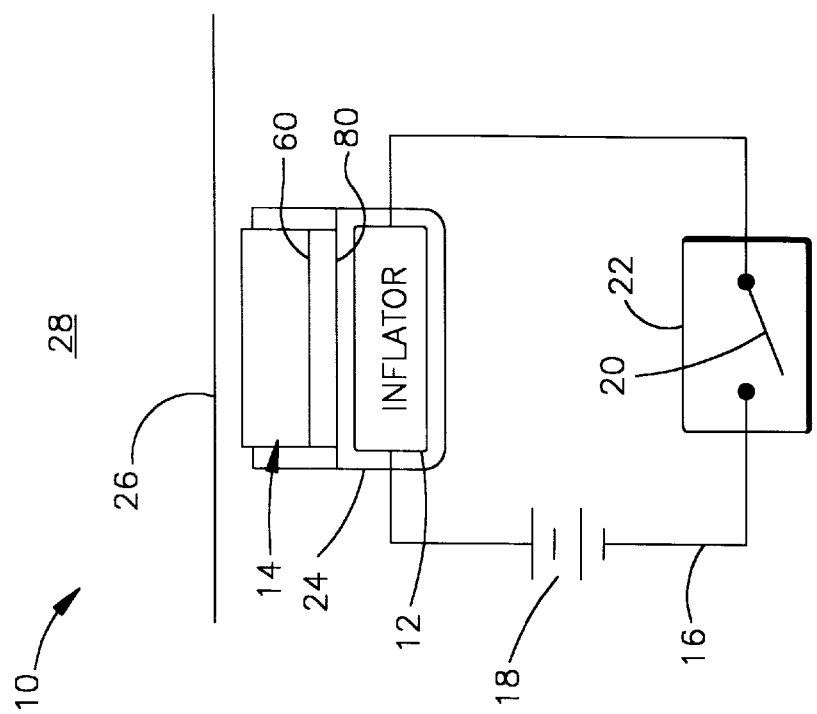

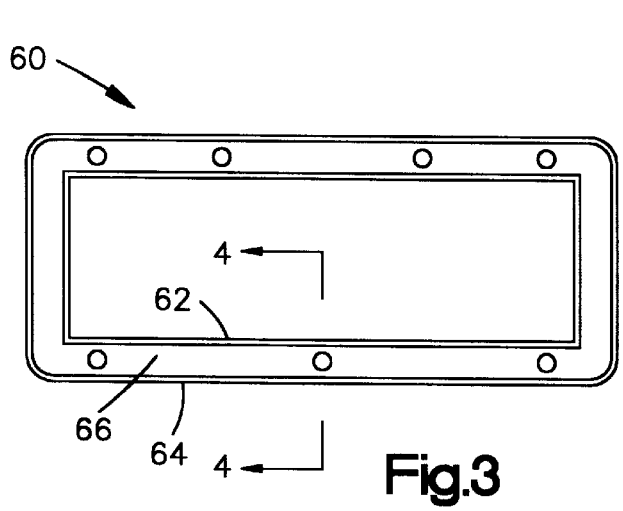
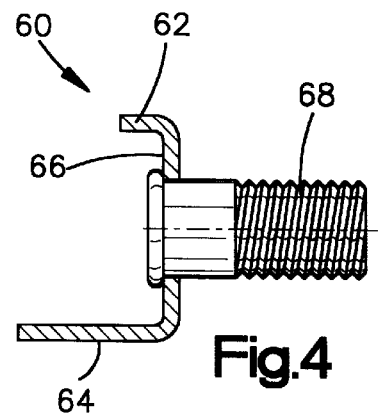
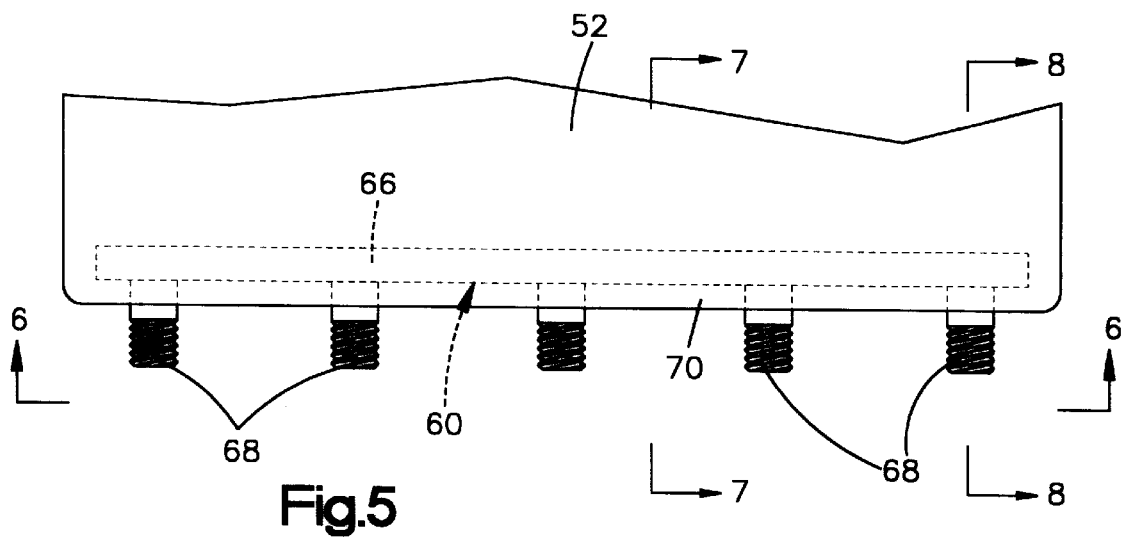
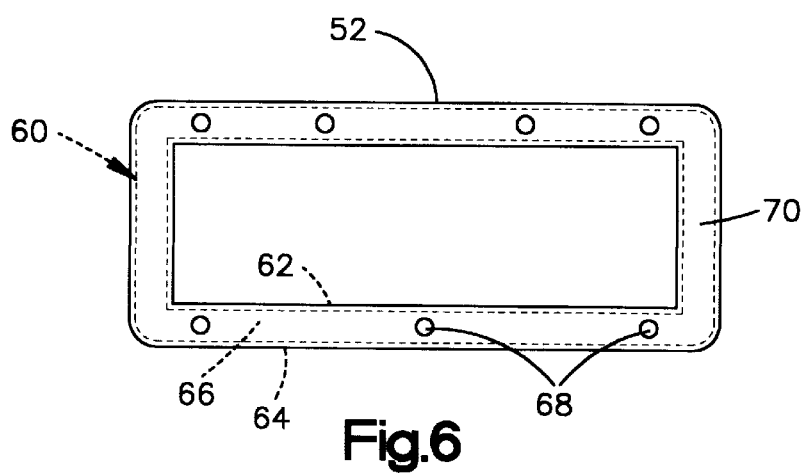

AIRBAG OPENING EDGE PORTION HAVING COILED CONNECTION TO RETAINER

FIELD OF THE INVENTION

The present invention relates to an apparatus for protecting an occupant of a vehicle, and particularly relates to an apparatus including an inflatable vehicle occupant protection device.

BACKGROUND OF THE INVENTION

An inflatable vehicle occupant protection device, such as an air bag, is part of an apparatus which further includes a crash sensor and an inflator. The crash sensor senses vehicle conditions that indicate the occurrence of a crash. When the crash sensor senses a crash-indicating condition of at least a predetermined threshold level, the inflator is actuated. The inflator then emits inflation fluid which inflates the air bag into the vehicle occupant compartment to help restrain movement of an occupant of the vehicle.

The air bag and the inflator are installed together at a location in the vehicle adjacent to the vehicle occupant compartment. For example, a driver's side air bag and inflator may be located on the vehicle steering column. A passenger side air bag and inflator may be located in the vehicle instrument panel.

In addition to the air bag and the inflator, the apparatus typically includes a reaction structure and a retainer. The reaction structure supports the inflator and the air bag at the installed location in the vehicle. The retainer typically comprises a circular ring or a rectangular frame surrounding the inflator. An edge portion of the air bag also surrounds the inflator. A plurality of fasteners clamp the edge portion of the air bag between the retainer and the reaction structure. When the inflation fluid emitted from the inflator flows into the air bag to inflate the air bag, the force of the inflation fluid pressure tends to pull the edge portion of the air bag outward from between the retainer and the reaction structure.

SUMMARY OF THE INVENTION

In accordance with the present invention, an apparatus comprises an inflatable vehicle occupant protection device and a retainer. The protection device comprises a panel structure having a portion coiled around the retainer.

BRIEF DESCRIPTION OF THE DRAWINGS

The foregoing and other features of the present invention will become apparent to those skilled in the art to which the present invention relates from reading the following description with reference to the accompanying drawings, in which:

FIG. 1 is a schematic view of a vehicle occupant protection apparatus comprising a first embodiment of the present invention;

FIG. 2 is a view showing the apparatus of FIG. 1 in an actuated condition;

FIG. 3 is a view of a part of the apparatus of FIG. 1;

FIG. 4 is a view taken on line 4—4 of FIG. 3;

FIG. 5 is an enlarged partial view of parts of the apparatus of FIG. 1;

FIG. 6 is a view taken on line 6—6 of FIG. 5;

Description of a Preferred Embodiment

Figure 7:
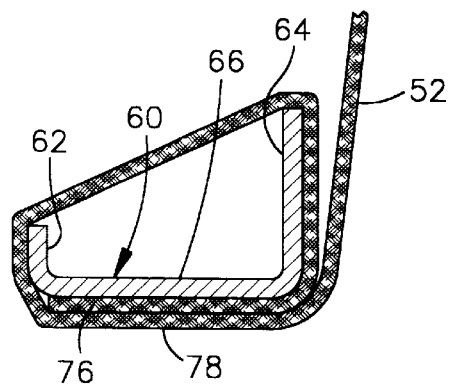
FIG. 7 is a view of taken on line 7—7 of FIG. 5.

A vehicle occupant protection apparatus 10 comprising a preferred embodiment of the present invention is shown schematically in FIGS. 1 and 2. The apparatus 10 includes an inflator 12 and a particular type of inflatable vehicle occupant protection device 14 which is known as an air bag. The air bag 14 is inflatable from a folded, stored condition, as shown in FIG. 1, to an unfolded, deployed condition, as shown in FIG. 2.

The inflator 12 comprises a source of inflation fluid for inflating the air bag 14. As known in the art, the inflator 12 may contain an ignitable gas generating material for generating a large volume of gas. The inflator 12 may alternatively contain a stored quantity of pressurized inflation fluid, or a combination of pressurized inflation fluid and ignitable material for heating the inflation fluid.

As shown schematically in FIG. 1, the inflator 12 is included in an electrical circuit 16 with a power source 18 and a normally open switch 20. The power source 18 is preferably the vehicle battery and/or a capacitor. The switch 20 is part of a sensor 22 that senses a condition indicating the occurrence of a vehicle crash. Such a condition may comprise, for example, sudden vehicle deceleration caused by a crash. If the crash-indicating condition is above a predetermined threshold level, the switch 20 closes. Electric current is then directed through the inflator 12 to actuate the inflator 12. As a result, the inflator 12 rapidly emits a large volume of inflation fluid which flows into the air bag 14 to inflate the air bag 14.

The air bag 14 and the inflator 12 are mounted on a supporting structure 24 which, in turn, is mounted on a part 26 of the vehicle adjacent to the vehicle occupant compartment 28. The supporting structure 24 in the preferred embodiment is a reaction canister which contains the air bag 14 and the inflator 12. The supporting structure 24 could alternatively comprise, for example, a reaction plate, a manifold, or the like. Accordingly, the vehicle part 26 in the preferred embodiment is the instrument panel, but could alternatively be the steering column, a door panel, or any other suitable part of the vehicle adjacent to the occupant compartment 28.

The air bag 14 may be constructed of one or more panels of any suitable material known in the art, including woven materials and plastic films. The panels of air bag material are interconnected along seams that are formed by stitches, ultrasonic welds, adhesives, and/or heat staking, depending on the particular air bag material of which the panels are formed. Preferably, the air bag 14 is constructed of panels formed of a nylon fabric which is coated with silicone. Any suitable arrangement of folds can be used to place the air bag 14 in the folded, stored condition in which it is shown in FIG. 1.

As shown in FIG. 2, the air bag 14 has a body 50 and a neck 52. A seam 54 joins the body 50 to the neck 52. When the air bag 14 is being inflated from the condition of FIG. 1 to the condition of FIG. 2, the body 50 of the air bag 14 is deployed from the reaction canister 24. The neck 52 of the air bag 14 is retained in the reaction canister 24 with the inflator 12. Specifically, the neck 52 is clamped between the reaction canister 24 and a retainer 60.

The retainer 60 in the preferred embodiment of the invention is a rectangular metal frame, as shown in FIG. 3. As shown in FIG. 4, the retainer 60 has a somewhat channel-shaped cross section. The retainer 60 thus has a pair of parallel rim portions 62 and 64 projecting from a flat base portion 66. A plurality of fasteners 68 project axially from one side of the base portion 66 of the retainer 60. The fasteners 68 in the preferred embodiment are screw-threaded mounting studs.

The retainer 60 is received within the neck 52 of the air bag 14 before the neck 52 is joined to the body 50 along the seam 54 (FIG. 2). As shown in FIGS. 5 and 6, the neck 52 of the air bag 14 has an open end portion 70. The retainer 60 supports the end portion 70 of the neck 52 in a rectangular configuration.

Figure 8:
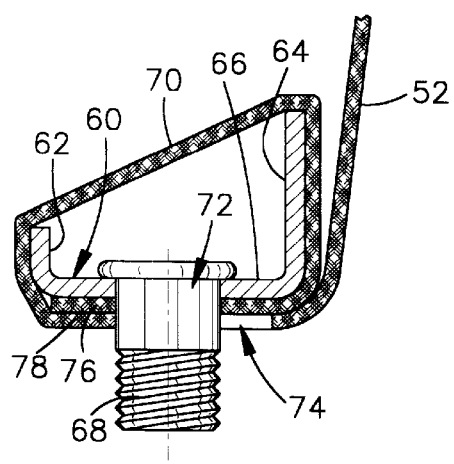
FIG. 8 is a view taken on line 8—8 of FIG. 5.

As shown in greater detail in FIGS. 7 and 8, the end portion 70 of the neck 52 is rolled up and coiled around the retainer 60. Each mounting stud 68 (FIG. 8) is received through a corresponding pair of aligned apertures 72 and 74 in the end portion 70 of the neck 52. The apertures 72 and 74 are located on overlapping plies 76 and 78, respectively, of the air bag panel material at the end portion 70 of the neck 52.

When the air bag 14 is being installed in the reaction canister 24 (FIGS. 1 and 2), the retainer 60 and the neck 52 of the air bag 14 are received against an inner wall portion 80 of the reaction canister 24. As shown by way of example in FIG. 9, each mounting stud 68 is then received through a corresponding aperture 82 in the inner wall portion 80 of the reaction canister 24. Nuts 84 are tightened onto the mounting studs 68 to draw the retainer 60 toward the inner wall portion 80 of the reaction canister 24. The retainer 60 then presses the overlapping plies 76 and 78 of air bag panel material together against the inner wall portion 80 of the reaction canister 24 under the clamping force developed by the nuts 84.

As described above with reference to FIG. 2, inflation fluid pressure forces act on the body 50 of the air bag 14 to deploy the body 50 outward from the reaction canister 24. The inflation fluid pressure forces also act on the neck 52 of the air bag 14, as indicated by the arrow shown in FIG. 9, and are transmitted through the neck 52 to the ply 78 of air bag panel material adjoining the inner wall portion 80 of the reaction canister 24. This urges the ply 78 to move outward between the retainer 60 and the inner wall portion 80 from left to right, as viewed in FIG. 9. Such movement of the ply 78 would wrap the coiled end portion 70 of the neck 52 more tightly around the retainer 60. Accordingly, the coiled configuration of the end portion 70 helps to ensure that the neck 52 of the air bag 14 is retained securely in the reaction canister 24.

Figure 9:
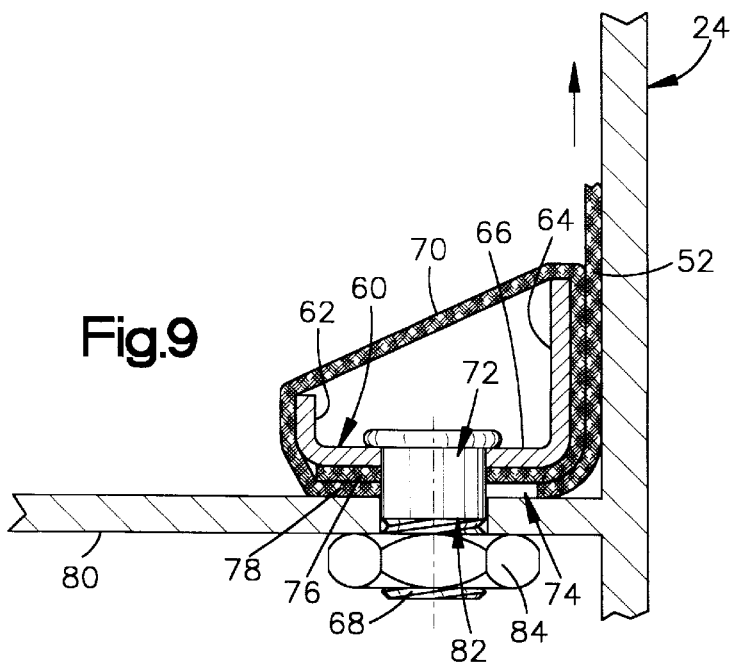
FIG. 9 is a view showing the parts of FIG. 8 in an interconnected relationship with another part of the apparatus of FIG. 1.
Figure 10:
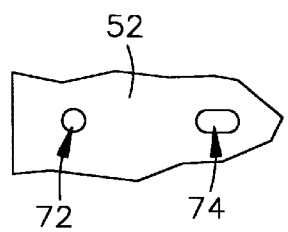
FIG. 10 is a partial view of a part of the apparatus of FIG. 1.

A particular feature of the present invention relates to the apertures 72 and 74 in the overlapping plies 76 and 78 of air bag panel material. Each aperture 72 in the inner ply 76 is circular, as shown by way of example in FIG. 10. The circular apertures 72 preferably have diameters approximately equal to the diameters of the mounting studs 68, as shown in FIG. 8. Each aperture 74 in the outer ply 78 is a slot (FIG. 10). The slots 74 are elongated in directions extending laterally outward across the retainer 60, and are thus elongated in directions extending circumferentially relative to the coiled configuration of the end portion 70 of the neck 52, as shown in FIGS. 8 and 9.

Importantly, the lengths of the slots 74 are significantly greater than the diameters of the mounting studs 68. This enables the outer ply 78 to be moved laterally outward across the retainer 60 when the studs 68 are received in the slots 74. Such movement of the outer ply 78 occurs upon coiling of the end portion 70 of the neck 52 around the retainer 60. The slots 74 are thus configured such that the studs 68 will not block the end portion 70 of the neck 52 from being coiled closely around the retainer 60 to the substantially slack-free condition shown in FIGS. 7–9.

In accordance with another particular feature of the present invention, the coiled end portion 70 of the neck 52 is free of a seam that interconnects the overlapping plies 72 and 74 in a closed loop around the retainer 60. This is because the coiled configuration ensures that the end portion 70 of the neck 52 is securely looped around the retainer 60 without the use of such a seam.

From the foregoing description of the invention, those skilled in the art will perceive improvements, changes and modifications. For example, the retainer 60 in the preferred embodiment of the invention is a one-piece structure in the configuration of a rectangular frame with a channel-shaped cross-section. An alternative embodiment of the invention could include a retainer having two or more pieces, a retainer with a circular or other peripheral configuration, and/or a retainer with a flat or other cross-sectional configuration. Although the air bag panel material at the neck 52 of the air bag 14 is shown in FIGS. 7–9 as a single layer of material, it could alternatively comprise two or more layers of material. Moreover, other inflatable vehicle occupant protection devices that can be used in accordance with the invention include, for example, inflatable seat belts, inflatable knee bolsters, inflatable headliners or side curtains, and knee bolsters operated by inflatable air bags. Such improvements, changes and modifications within the skill of the art are intended to be covered by the appended claims.

What is claimed is:

1. Apparatus comprising:

an inflatable vehicle occupant protection device having a panel structure, said panel structure having an open end portion that is axially separated from a portion for attaching a body structure;

at least one pair of axially aligned apertures extending through said panel structure;

a retainer for supporting said open end portion of said panel structure of said protection device;

said panel structure being coiled around said retainer such that said axially aligned apertures become aligned on a same side of said retainer.

2. Apparatus as defined in claim 1 wherein said apertures include a slot-shaped aperture elongated in a direction extending circumferentially relative to said coiled portion of said panel structure.

3. Apparatus as defined in claim 1 wherein said coiled portion of said panel structure is coiled around said retainer in a substantially slack-free condition.

4. Apparatus as defined in claim 1 wherein said protection device is free of a seam that interconnects said overlapping plies in a closed loop around said retainer.

5. Apparatus as defined in claim 2 wherein a circular aperture is interposed between said slot-shaped aperture and said open end portion of said panel structure.

6. Apparatus as defined in claim 5 wherein said coiled portion of said panel structure forms overlapping plies, the overlapping plies comprising an inner ply and an outer ply, said inner ply being interposed between said retainer and said outer ply, said circular aperture extending through said inner ply and said slot-shaped aperture extending through said outer ply.

7. Apparatus comprising:

an inflatable vehicle occupant protection device;

an inflator having a source of inflation fluid, said inflator being actuatable to release inflation fluid into said protection device to inflate said protection device;

a sensor for sensing a vehicle crash condition and actuating said inflator in response to said vehicle crash condition; and a retainer for supporting a portion of said protection device, said portion of said protection device being coiled around said retainer, said coiled portion forming overlapping plies comprising an inner ply and an outer ply in contact with each other on the same side of the retainer, said outer ply moving relative to said inner ply upon inflation of said protection device which tightens said coiled portion around said retainer.

8. Apparatus as defined in claim 7 wherein said coiled portion of said protection device is coiled around said retainer in a substantially slack-free condition.

9. Apparatus as defined in claim 7 wherein said coiled portion of protection device is free of a seam interconnecting said overlapping plies in a closed loop around said retainer.

\* \* \* \* \*